United States Patent
Asada (10) Patent No.: US 8,488,412 B2
(45) Date of Patent: *Jul. 16, 2013

(54) UNDERWATER DETECTION DEVICE

(75) Inventor: Yasunobu Asada, Nishinomiya (JP)

(73) Assignee: Furuno Electric Company, Ltd., Nishinomiya (JP)

(*) Notice: Subject to any disclaimer, the term of this patent is extended or adjusted under 35 U.S.C. 154(b) by 33 days.

This patent is subject to a terminal disclaimer.

(21) Appl. No.: 13/214,051

(22) Filed: Aug. 19, 2011

(65) Prior Publication Data

US 2011/0298633 A1    Dec. 8, 2011

Related U.S. Application Data

(63) Continuation of application No. 12/478,951, filed on Jun. 5, 2009, now Pat. No. 8,059,487.

(30) Foreign Application Priority Data

Jun. 6, 2008  (JP) .................................. 2008-148737

(51) Int. Cl.
  *G01S 3/80*    (2006.01)
(52) U.S. Cl.
  USPC .............................................. 367/126; 367/93
(58) Field of Classification Search
  USPC .................................. 367/126, 93; 342/26 R
  See application file for complete search history.

(56) References Cited

U.S. PATENT DOCUMENTS

| | | | | |
|---|---|---|---|---|
| 5,043,951 A | * | 8/1991 | Gilmour et al. | 367/126 |
| 5,417,114 A | * | 5/1995 | Wadaka et al. | 73/602 |
| 2004/0037166 A1 | * | 2/2004 | Handa et al. | 367/103 |

FOREIGN PATENT DOCUMENTS

| | | |
|---|---|---|
| GB | 2 452 831 A | 3/2009 |
| JP | 2005-249398 A | 9/2005 |

* cited by examiner

*Primary Examiner* — Shirley Lu
(74) *Attorney, Agent, or Firm* — Birch, Stewart, Kolasch & Birch, LLP (57) ABSTRACT

An underwater detection device includes a transceiver module for transmitting underwater an ultrasonic pulse signal that is frequency-modulated and receiving an echo signal corresponding to the transmitted signal, a pulse compression module for pulse-compressing the signal received by the transceiver module and outputting a signal pulse-compressed, a suppression range determining module for determining a suppression range where a range side lobe suppression process is performed for the pulse-compressed signal, an echo determining module for determining whether the data of the pulse-compressed signal at each depth corresponding to a range side lobe, a suppression value determining module for determining a suppression value for the data of the pulse-compressed signal at each depth, a suppression conducting module for performing a calculation to suppress the range side lobe based on the suppression value for the data determined to be data of the pulse-compressed signal corresponding to the range side lobe by the echo determining module among a plurality of data of the pulse-compressed signals that fall into the suppression range, and a display processing module for generating a signal for display based on the signal outputted from the suppression conducting module to display a generated signal as detected information.

4 Claims, 6 Drawing Sheets

UNDERWATER DETECTION DEVICE

CROSS-REFERENCE TO RELATED APPLICATION(S)

This application is a Continuation of application Ser. No. 12/478,951 filed on Jun. 5, 2009, now U.S. Pat. No. 8,059,487 which claims priority under 35 U.S.C. Section 119 to Japanese Patent Application No. 2008-148737 filed in Japan on Jun. 6, 2008. The entire contents of all of the above applications is hereby incorporated by reference.

TECHNICAL FIELD

The present invention relates to an underwater detection device that transmits a frequency-modulated transmission pulse signal, receives a signal reflected from a target object, and carries out a pulse compression process of the received signal, and more particularly, to an underwater detection device having a configuration to remove range side lobes produced in association with the pulse compression.

BACKGROUND

For fishfinders that is one type of underwater detection devices, increasing in detection distance is demanded to detect a shoal of fish at a deeper location. In order to increase the detection distance, generally, a transmission pulse length is simply lengthened. However, if the transmission pulse length is lengthened, an echo reflected from a target object will also be longer, and the axial resolving power will be reduced. Thus, a method of increasing the axial resolving power may be adopted in which a transmission pulse is frequency-modulated, and a received echo signal and a replica waveform of the transmitted signal is correlation-processed to perform a pulse compression of the received signal. An underwater detection device that performs such a pulse compression process is disclosed in JP2005-249398 (A).

Figure 10:
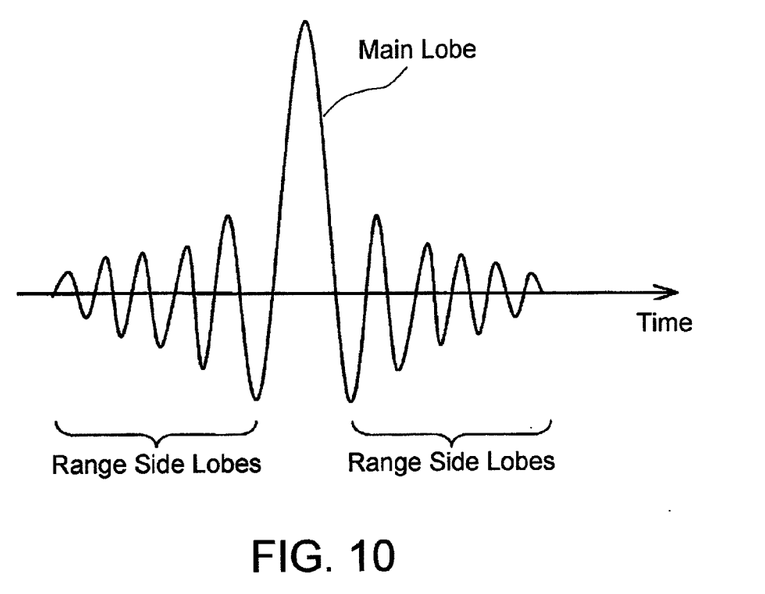
FIG. 10 is a waveform chart for illustrating range side lobes produced in association with a pulse compression.

However, in the underwater detection device that performs the pulse compression process, as shown in FIG. 10, false images referred to as "range side lobes" appear at positions before and after a main lobe, that shows a position of a detection target object, of a pulse-compressed signal.

When the range side lobes appear, especially due to a seabed, the false images may be mistakenly viewed by an operator as a target object, such as a school of small fish. In addition, an image of a shoal of fish located near the seabed may be difficult to view and a seabed depth may mistakenly be determined.

SUMMARY

The present invention provides an underwater detection device that suppresses range side lobes due to a seabed to clearly display a detection image of near the seabed.

According to an aspect of the invention, an underwater detection device includes a transceiver module for transmitting underwater an ultrasonic pulse signal that is frequency-modulated and receiving an echo signal corresponding to the transmitted signal, a pulse compression module for pulse-compressing the signal received by the transceiver module and outputting a signal pulse-compressed, a suppression range determining module for determining a suppression range where a range side lobe suppression process is performed for the pulse-compressed signal, an echo determining module for determining whether the data of the pulse-compressed signal at each depth corresponding to a range side lobe, a suppression value determining module for determining a suppression value for the data of the pulse-compressed signal at each depth, a suppression conducting module for performing a calculation to suppress the range side lobe based on the suppression value for the data determined to be data of the pulse-compressed signal corresponding to the range side lobe by the echo determining module among a plurality of data of the pulse-compressed signals that fall into the suppression range, and a display processing module for generating a signal for display based on the signal outputted from the suppression conducting module to display a generated signal as detected information.

According to the aspect of the present invention, the underwater detection device can be realized in which the range side lobes due to the seabed is suppressed and the detection image of near the seabed is clearly displayed.

The suppression range determining module may include a forward peak-hold module that selects, for each depth, data with the largest signal strength among data of the pulse-compressed signals falling into a depth range from the depth concerned to a depth deeper by a predetermined depth, and outputs the selected data as a forward peak-hold value of the depth concerned, and a rearward peak-hold module that selects, for each depth, data with the largest signal strength among data of the pulse-compressed signals falling into a depth range from the depth concerned to a depth shallower by the predetermined depth, and outputs the selected data as a rearward peak-hold value of the depth concerned. The suppression range determining module may determine a depth range where the forward peak-hold value is greater than a first predetermined threshold and the rearward peak-hold value is less than the first predetermined threshold, as the suppression range.

When a value obtained by dividing the forward peak-hold value by the data of the pulse-compressed signal at the same depth is greater than a second predetermined threshold, the echo determining module may determine the data concerned to be data corresponding to a range side lobe.

The suppression value determining module may determine the suppression value based on a suppression offset value defined with a first average value derived based on data of the pulse-compressed signal within the suppression range and a second average value derived based on data of the pulse-compressed signal outside the suppression range but within a predetermined depth range, and a suppression function that is a function simulating a shape of a range side lobe.

According to another aspect of the invention, a ship may be equipped with any one of the underwater detection devices described above.

BRIEF DESCRIPTION OF THE DRAWINGS

The present disclosure is illustrated by way of example and not by way of limitation in the figures of the accompanying drawings in which the like reference numerals indicate like elements and in which.

DETAILED DESCRIPTION

An embodiment in which the present invention is applied to a fishfinder is explained referring to the appended drawings.

Figure 1:
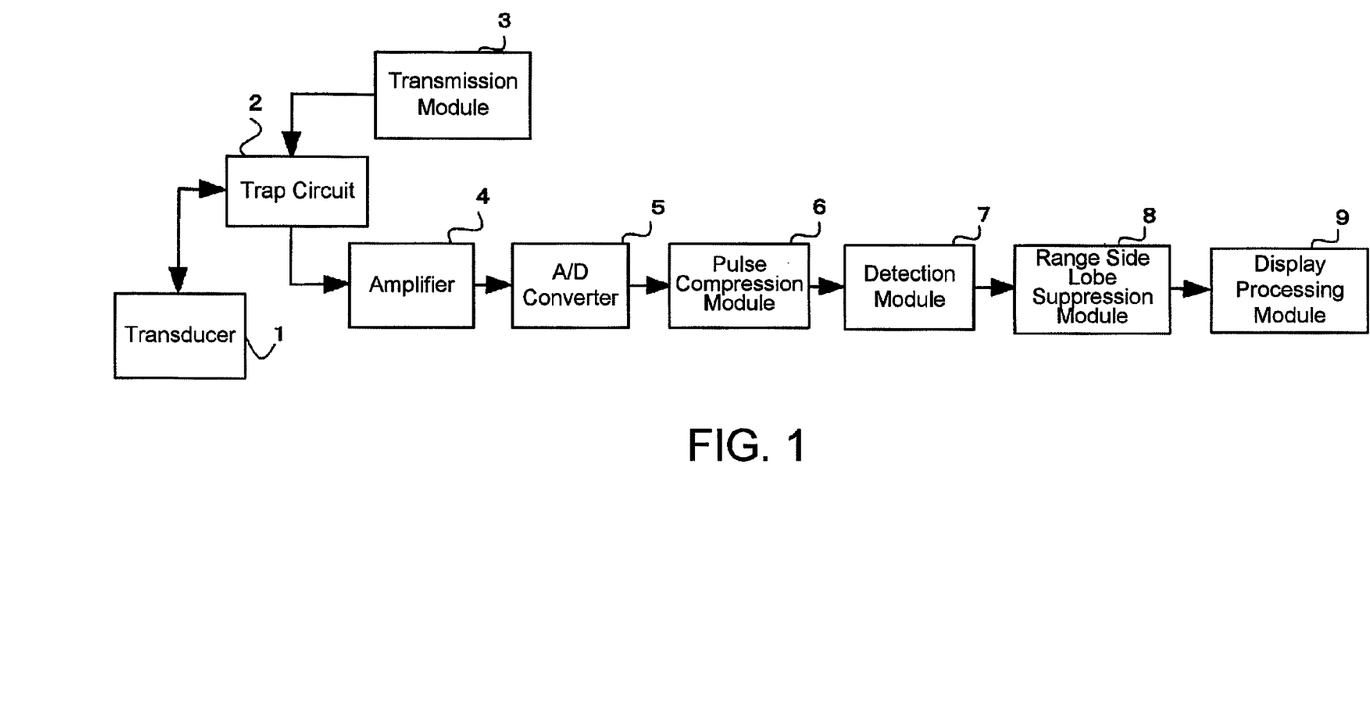
FIG. 1 is a block diagram of a fishfinder according to an embodiments of the present invention.

FIG. 1 is a block diagram of the fishfinder according to this embodiment. As shown in FIG. 1, a transducer 1 typically provided at the bottom of a ship is driven by an electric signal supplied from a transmission module 3 via a trap circuit 2 to transmit an ultrasonic pulse signal to underwater and receive an echo reflected and returned from an underwater target object. The transducer 1 then outputs the received signal to an amplifier 4 via the trap circuit 2.

The amplifier 4 amplifies the received signal, and the A/D converter 5 samples the amplified signal and converts it into a digital signal. A pulse compression module 6 performs a cross correlation process with the digital signal from the A/D converter 5 and a replica waveform of the transmission pulse signal, and then outputs the pulse-compressed signal. A detection module 7 detects the pulse-compressed signal. A range side lobe suppression module 8 performs a process to suppress range side lobes for the detected pulse-compressed signal as described below. A display processing module 9 generates a signal for display based on the pulse-compressed signal from the range side lobe suppression module 8 the range side lobes of which are suppressed, and then displays an underwater image on a display thereof.

Figure 2:
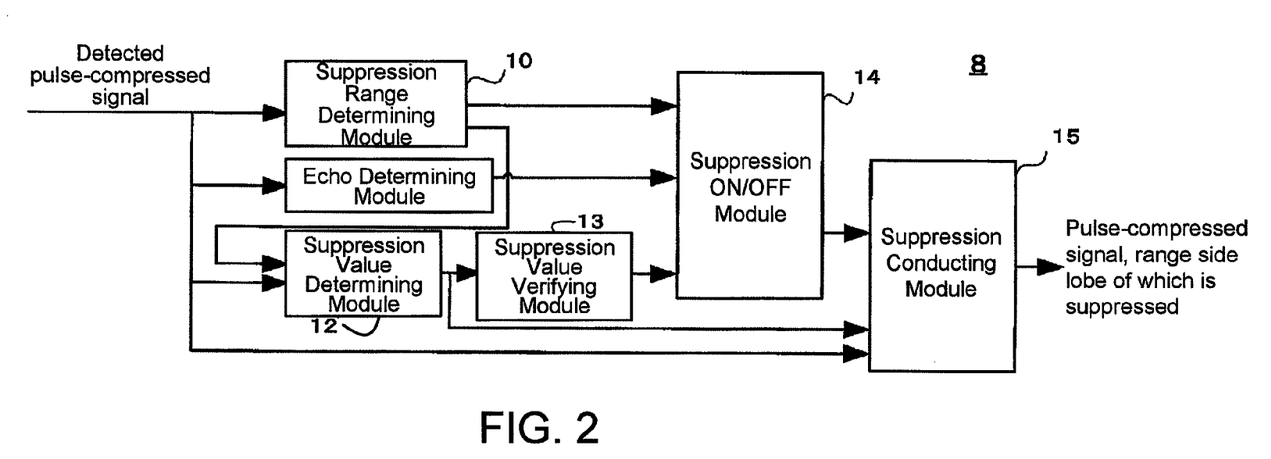
FIG. 2 is a block diagram showing a configuration example of a range side lobe suppression module.

FIG. 2 shows a particular configuration example of the range side lobe suppression module 8. Here, the detected pulse-compressed signal inputted into the range side lobe suppression module 8 is SIGin [n] (n=0 to (N−1)) and N is a data number obtained by one transmission and reception.

In FIG. 2, a suppression range determining module 10 determines a range where range side lobes of the pulse-compressed signal are suppressed. An echo determining module 11 determines whether data of the pulse-compressed signal at each depth is echo data from a detection target object or data corresponding to a range side lobe. A suppression value determining module 12 determines a suppression value to be used when performing an operation to suppress the range side lobe for data of the pulse-compressed signal at each depth.

A suppression value verifying module 13 verifies whether the suppression value determined by the suppression value determining module 12 is an appropriate value. A suppression ON/OFF module 14 determines whether the suppression process of the range side lobe is to be performed for the data at each depth based on the output result of the suppression range determining module 10, the output result of the echo determining module 11, and the verified result of the suppression value verifying module 13. A suppression conducting module 15 performs a suppression operation of the range side lobe by giving a predetermined calculation with the suppression value determined by the suppression value determining module 12 for the data of the pulse-compressed signal at each depth based on the determination result of the suppression ON/OFF module 14.

Figure 3:
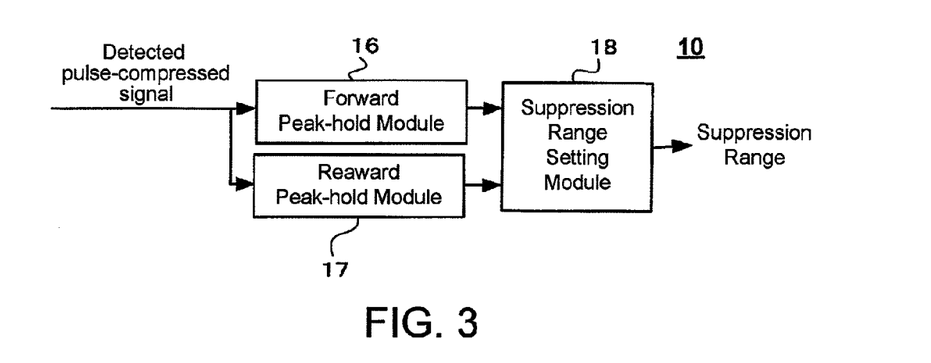
FIG. 3 is a block diagram showing a configuration example of a suppression range determining module.

FIG. 3 shows a configuration example of the suppression range determining module 10. In FIG. 3, a forward peak-hold module 16 selects data which is the largest in signal strength from the data of the pulse-compressed signals falling into a depth range from each depth concerned to a predetermined deeper depth, respectively, and outputs the selected data as a forward peak-hold value of the depth concerned. Specifically, a forward peak-hold value MPH_F [n] (hereinafter, abbreviated as, "forward PH value") may be generated using the following Equation (1):

$$MPH\_F[n] = \max(SIGin[n+1, n+k]) \qquad (1)$$

In Equation (1), max(SIGin [n+1,n+k]) represents data with the maximum signal strength among the pulse-compressed signal data from SIGin [n+1] to SIGin [n+k]. The value k is a data number corresponding to the above-described predetermined depth, and it may be desirable to be a number substantially corresponding to a length of the transmission pulse.

A rearward peak-hold module 17 selects data which is the largest in signal strength from the data of the pulse-compressed signals falling into a depth range from each depth concerned to a predetermined shallower depth, respectively, and outputs the selected data as a rearward peak-hold value of the depth concerned. Specifically, the rearward peak-hold value MPH_B [n] (hereinafter, abbreviated as a "rearward PH value") may be generated by the following Equation (2):

$$MPH\_B[n] = \max(SIGin[n-k+1, n]) \qquad (2)$$

The suppression range setting module 18 sets a suppression range to a range where the forward PH value exceeds a predetermined threshold (first threshold) and the rearward PH value does not exceed the threshold.

Figure 6:
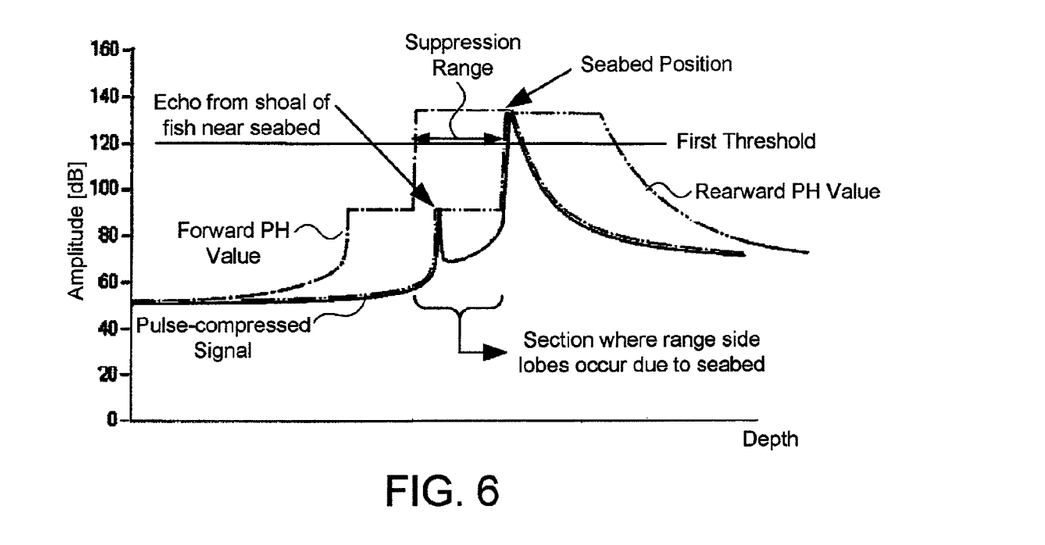
FIG. 6 is a waveform chart for illustrating a signal processing in the suppression range determining module.

FIG. 6 shows a particular example in which the forward PH value and the rearward PH value are calculated for the detected pulse-compressed signal and the suppression range is set based on the threshold. In FIG. 6, the first threshold is set to 120 dB, and a solid line represents the pulse-compressed signal, a dashed dotted line represents the forward PH value, and a two dotted line represents the rearward PH value.

Alternatively, the suppression range determining module 10 may have a configuration in which a pulse-compressed signal is compared with a predetermined threshold, and a range from a position at which the pulse-compressed signal exceeds the threshold to a position shallower by the transmission pulse length is set to be the suppression range. Further, the suppression range determining module 10 may have a configuration in which a range from a seabed position derived by a known seabed detecting method to a position shallower by the transmission pulse length is set to be the suppression range.

Figure 4:
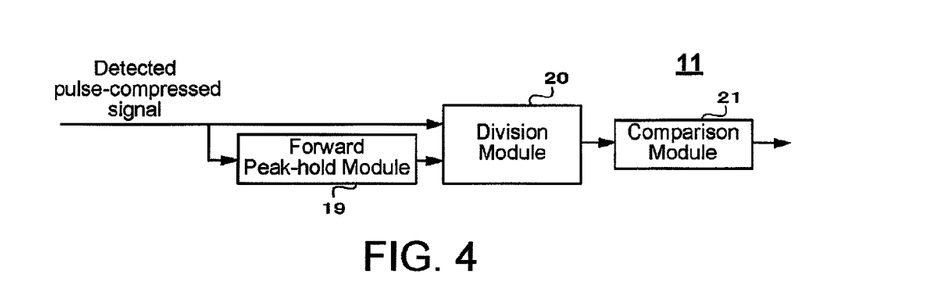
FIG. 4 is a block diagram showing a configuration example of an echo determining module.

FIG. 4 shows a configuration example of the echo determining module 11. A forward peak-hold module 19 has the same function as the forward peak-hold module 16 of FIG. 3. The forward peak-hold modules 16 and 19 may also be configured as a single common module having both functions. A division module 20 divides the data MPH_F [n] of the forward PH value at each depth by the value SIGin [n] of the pulse-compressed signal at the depth concerned. A comparison module 21 compares the output result of the division module 20 with a predetermined threshold (second threshold). The comparison module 21 determines the data to be an echo from the detection target object when the output value is less than the second threshold, and determines the data concerned to be data corresponding to a range side lobe when the output value is greater than the second threshold.

Figure 7:
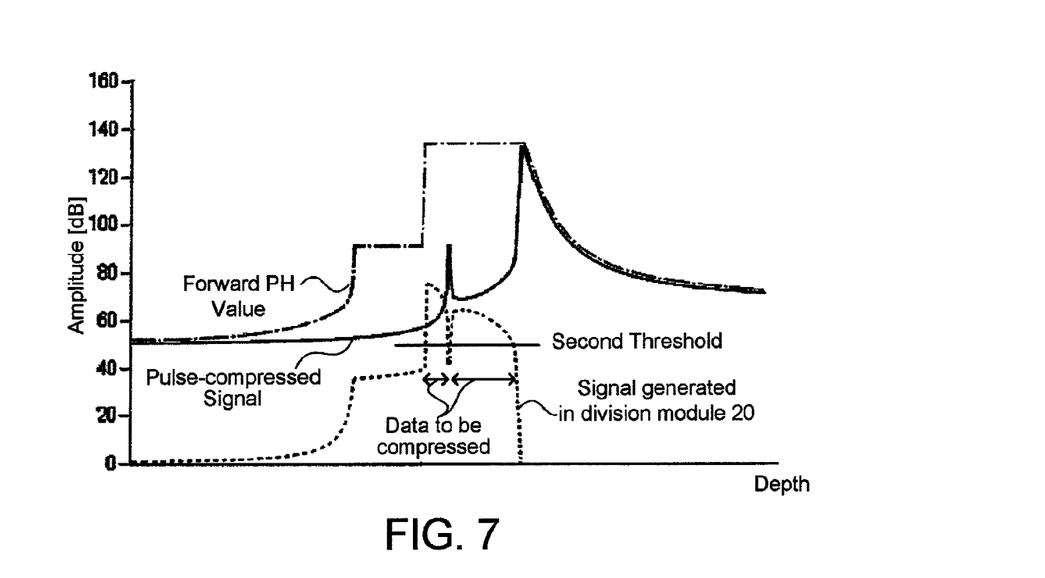
FIG. 7 is a waveform chart for illustrating a signal processing in the echo determining module.

FIG. 7 shows a waveform chart of each signal in the echo determining module 11 for the same received data as FIG. 6.

In FIG. 7, a graph with a dotted line represents a signal generated in the division module 20. In FIG. 7, the second threshold is set to approximately 50 dB, and data in ranges other than an echo from a shoal of fish at a seabed is determined to be suppressed.

Figure 5:
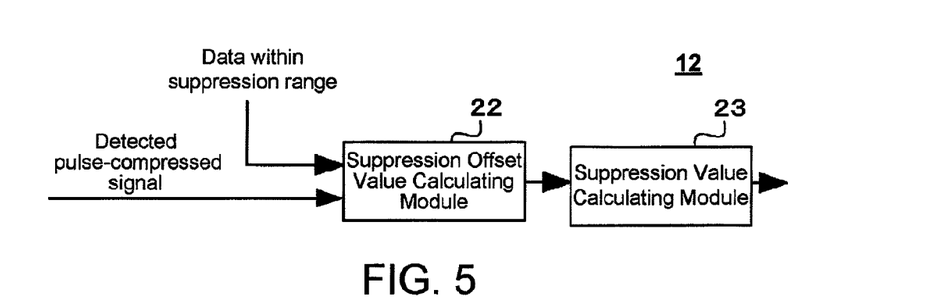
FIG. 5 is a block diagram showing a configuration example of a suppression value determining module.

FIG. 5 shows a configuration example of the suppression value determining module 12. A suppression offset value calculating module 22 divides an average value derived from a plurality of data within the suppression range ("first average value") by an average value calculated from data in a predetermined depth range other than the suppression range ("second average value"). The second average value may be calculated from data, for example, in a depth range from a starting position of the suppression range (e.g., an end portion on the shallower side of the suppression range) to a position shallower by the transmission pulse length. The suppression offset value calculating module 22 then outputs the division result as a suppression offset value. It may be desirable to exclude data greater than a predetermined level in the calculation of the first average value and the second average value.

A suppression value calculating module 23 stores in advance a function simulating a standard range side lobe shape that may be obtained by experiments as a suppression function. The suppression value calculating module 23 calculates a suppression value for each data based on a function produced multiplying the suppression function by the suppression offset value calculated by the suppression offset value calculating module 22.

Figure 8:
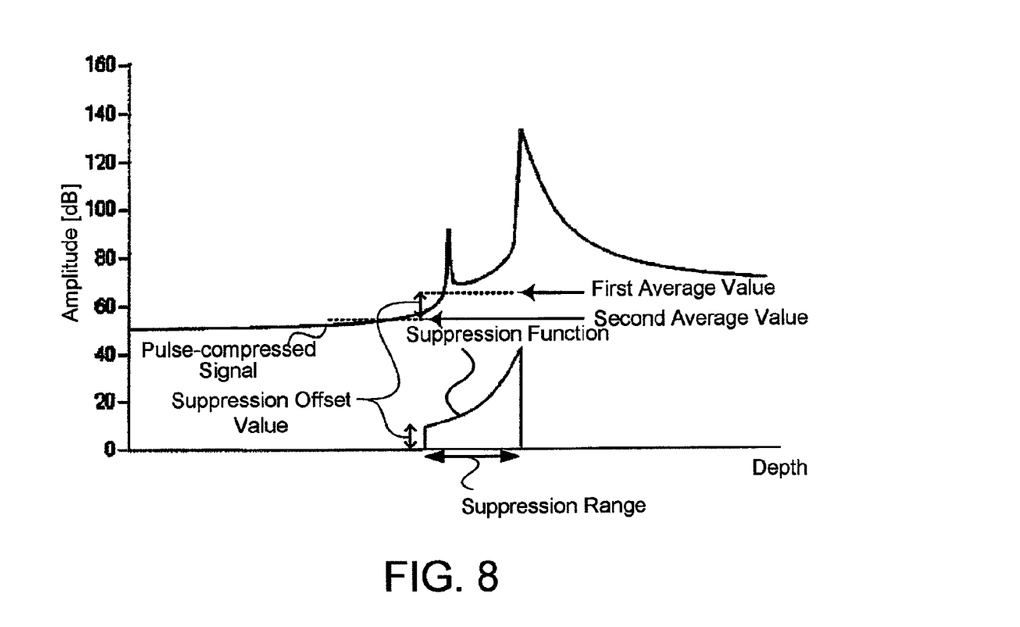
FIG. 8 is a waveform chart for illustrating a signal processing in the suppression value determining module.

FIG. 8 shows the calculated results of the first average value, the second average value, the suppression offset value, and the suppression value by the suppression value determining module 12 for the same received data as FIG. 6.

The suppression value verifying module 13 verifies whether the suppression value determined by the suppression value determining module 12 is an appropriate value. Specifically, the suppression value verifying module 13 verifies whether or not a suppression value which increases range side lobes in the calculation by the suppression conducting module 15 (division of each data by the suppression value) is an inappropriate suppression value (less than 1).

Based on the respective output results from the suppression range determining module 10, the echo determining module 11, and the suppression value verifying module 13, the suppression ON/OFF module 14 determines the suppression process for the data concerned to be performed, when the data falls into the suppression range and corresponds to the range side lobe and when an appropriate suppression value is calculated for the data concerned.

A suppression conducting module 15 performs a division of the data to be suppressed by the suppression value based on the determination result of the suppression ON/OFF module 14, and outputs it to the display processing module 9. The suppression conducting module 15 otherwise outputs data not to be suppressed to the display processing module 9 without performing the division.

Figure 9:
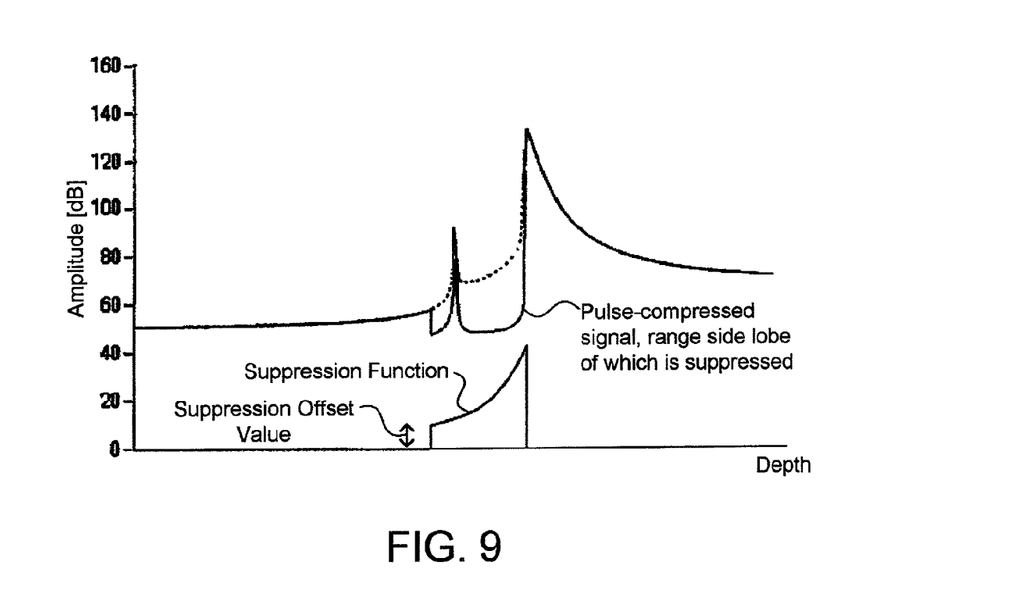
FIG. 9 is a waveform chart for illustrating a signal processing in a suppression conducting module.

FIG. 9 is a waveform chart resulting from the range side lobe suppression process performed in the suppression conducting module 15 for the same received data as FIG. 6. It can be seen that sections that fall into the range side lobes, due to the seabed, are suppressed without the echo signal from the target object near the seabed being weakened.

As described above, although the fishfinder was described as an example, the present invention may also be applied to other underwater detection devices, such as scanning sonar, PPI sonar, etc. In the above embodiment, the intended application is at sea; however, any water application may be possible within the scope of the invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "approximately" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. An underwater detection device, comprising:
    a transceiver module for transmitting underwater an ultrasonic pulse signal that is frequency-modulated and receiving an echo signal corresponding to the transmitted signal;
    a pulse compression module for pulse-compressing the signal received by the transceiver module and outputting a signal pulse-compressed;
    a suppression range determining module for determining a suppression range where a range side lobe suppression process is performed for the pulse-compressed signal;
    an echo determining module for determining whether the data of the pulse-compressed signal at each depth corresponds to a range side lobe;
    a suppression value determining module for determining a suppression value for the data of the pulse-compressed signal at each depth;
    a suppression conducting module for performing a calculation to suppress the range side lobe based on the suppression value for the data determined to be data of the pulse-compressed signal corresponding to the range side lobe by the echo determining module among a plurality of data of the pulse-compressed signals that fall into the suppression range; and a display processing module for generating a signal for display based on the signal outputted from the suppression conducting module to display a generated signal as detected information.

2. The underwater detection device of claim 1, wherein the suppression value determining module determines the suppression value based on a suppression offset value defined with a first average value derived based on data of the pulse-compressed signal within the suppression range and a second average value derived based on data of the pulse-compressed signal outside the suppression range but within a predetermined depth range, and a suppression function that is a function simulating a shape of a range side lobe.

3. An underwater detection device, comprising:

a transceiver module for transmitting underwater an ultrasonic pulse signal that is frequency-modulated and receiving an echo signal corresponding to the transmitted signal;

a pulse compression module for pulse-compressing the signal received by the transceiver module and outputting a signal pulse-compressed;

a suppression range determining module for determining a suppression range where a range side lobe suppression process is performed for the pulse-compressed signal, the suppression range determining module including a forward peak-hold module that selects, for each depth, data with the largest signal strength among data of the pulse-compressed signals falling into a depth range from the depth concerned to a depth deeper by a predetermined depth, and outputs the selected data as a forward peak-hold value of the depth concerned an echo determining module for determining whether the data of the pulse-compressed signal at each depth corresponds to a range side lobe;

a suppression value determining module for determining a suppression value for the data of the pulse-compressed signal at each depth;

a suppression conducting module for performing a calculation to suppress the range side lobe based on the suppression value for the data determined to be data of the pulse-compressed signal corresponding to the range side lobe by the echo determining module among a plurality of data of the pulse-compressed signals that fall into the suppression range; and a display processing module for generating a signal for display based on the signal outputted from the suppression conducting module to display a generated signal as detected information, wherein when a value obtained by dividing the forward peak-hold value by the data of the pulse-compressed signal at the same depth is greater than a second predetermined threshold, the echo determining module determines the data concerned to be data corresponding to a range side lobe.

4. The device of claim 3, wherein the suppression range determining module determines a depth range where the forward peak-hold value is greater than a first predetermined threshold as at least part of the suppression range.

* * * * *